United States Patent [19]
Mizzi Joseph M.

[11] 4,194,344
[45] Mar. 25, 1980

[54] SUGAR CANE HARVESTERS

[76] Inventor: Mizzi Joseph M., Halifax Rd., Ingham Queensland, Australia

[21] Appl. No.: 903,793

[22] Filed: May 8, 1978

[51] Int. Cl.² ............................................ A01D 45/10
[52] U.S. Cl. ..................................... 56/13.9; 198/624; 198/518
[58] Field of Search .................. 56/1, 13.6, 13.9, 294; 198/624, 518, 494

[56] References Cited
U.S. PATENT DOCUMENTS

| | | | |
|---|---|---|---|
| 3,673,774 | 7/1972 | Mizzi | 56/13.9 |
| 3,925,969 | 12/1975 | Shunichi | 56/13.9 |

FOREIGN PATENT DOCUMENTS 194509  1/1908  Fed. Rep. of Germany ............ 56/294

Primary Examiner—Russell R. Kinsey
Attorney, Agent, or Firm—Donald D. Jeffery

[57] ABSTRACT

In a sugar cane harvester of the type having a conveyor to carry the cane stalks, butt ends first, from a base cutter which severs the cane near ground level to a chopping cutter which cuts the stalks into billets, the conveyor consists of a series of transverse upper feed rollers and a series of oppositely rotated lower feed rollers, the cane being fed between the upper and lower feed rollers. Between succeeding lower feed rollers there are provided transverse cleaning rollers, driven in opposite direction to the lower feed rollers, and with radiating members which are adapted to catch and tear away leafy matter from the cane being conveyed.

6 Claims, 2 Drawing Figures

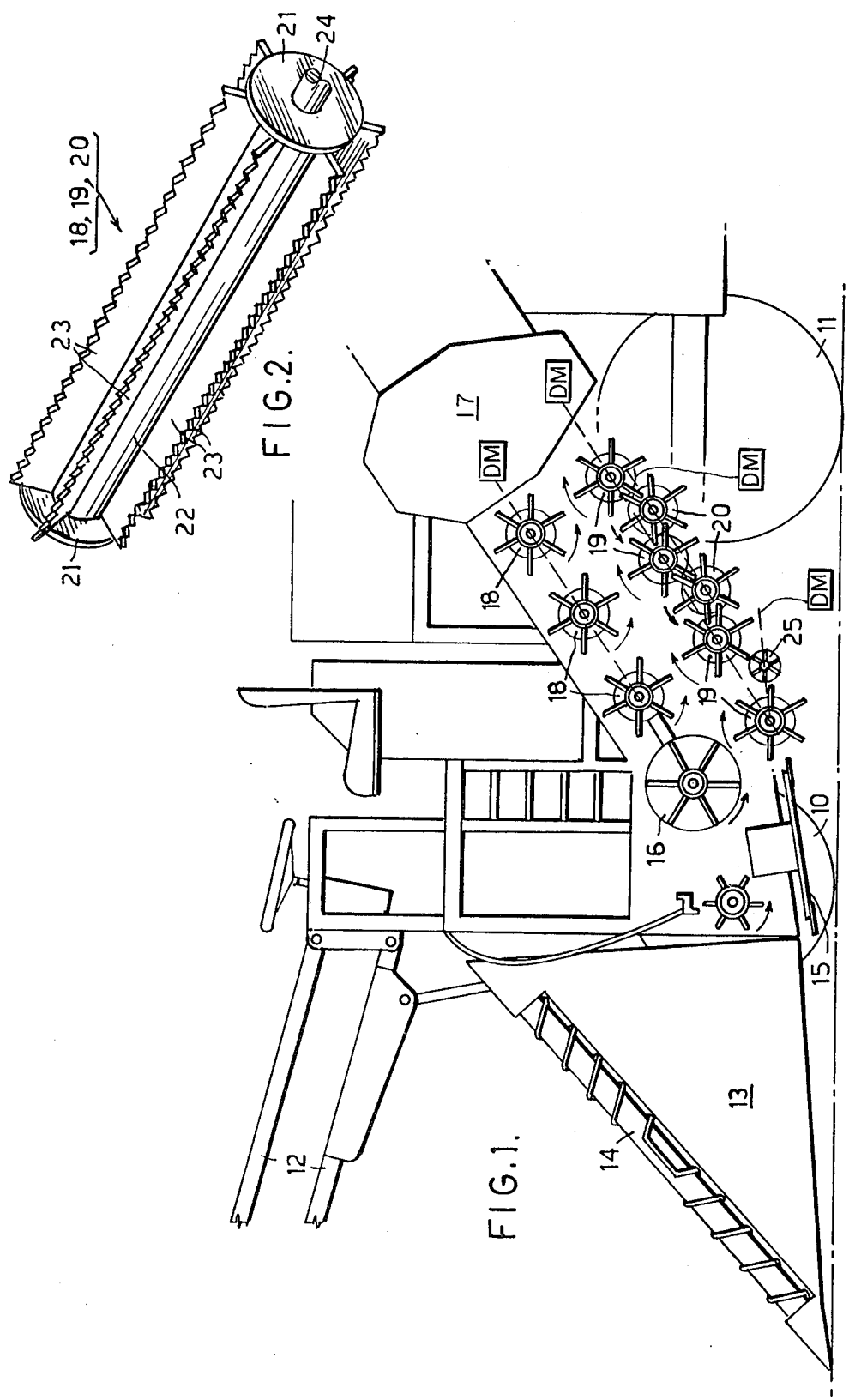

SUGAR CANE HARVESTERS

BACKGROUND OF THE INVENTION

This invention relates to improvements in sugar cane harvesters.

A well known type of cane harvester has a base cutter to cut the cane stalks near to ground level, and a feed conveyor to carry the cut cane stalks, butt ends first, rearwardly and upwardly through the harvester to a chopping cutter, which chops the cane stalks into billets and delivers them to an elevator which elevates and discharges them to be received in a bin drawn behind, or to the rear and one side of, the harvester. Since it is very undesirable that leafy material should be delivered with the cane billets, an extractor fan device is provided at the head of the elevator to carry this material away.

Cane is usually harvested mechanically after being burnt-off to eliminate excess leafy material, and with a minimum delay because fairly soon after burning-off, the cane commences to deteriorate significantly in quality. Unexpected rain may cause the harvesting to be postponed with the result that the cane, when harvested, has dropped in quality and value. Even when cane is harvested shortly after burning-off, its sugar content is likely to be lower than if it were harvested green. Although the advantages in harvesting green or unburnt cane are recognized, harvesters made have generally been unsatisfactory in eliminating the very considerable amount of leafy matter before the billets are discharged.

SUMMARY OF THE INVENTION

The present invention provides a sugar cane harvester incorporating particularly efficient means for cleaning a very high proportion of leafy matter from the cane being harvested.

The invention resides broadly in a cane harvester of the type having a cane stalk feed conveyor with a series of transverse upper feed rollers and a series of transverse lower feed rollers, cane being conveyed by and between the upper feed rollers driven in one direction and the lower feed rollers driven in opposite direction; wherein there are provided, between pairs of successive lower feed rollers, rotary cleaning rollers driven in the direction opposite to the lower feed rollers, arranged to clear cane conveyed between the upper and lower feed rollers, and having radiating members for catching and tearing away leafy matter depending from such cane between successive lower feed rollers. Preferably the radiating members of the cleaning rollers are longitudinal vanes with serrated outer edges, and the lower feed rollers also have longitudinal vanes with serrated outer edges, the vanes of the lower feed rollers and of the cleaning rollers being in intermeshing arrangement.

BRIEF DESCRIPTION OF THE DRAWINGS

A preferred embodiment of the invention is shown in the accompanying drawings, wherein:

FIG. 1 is a schematic longitudinal section of part of a sugar cane harvester according to the invention, and FIG. 2 is a perspective view of one of the rollers of the harvester's conveying and cleaning system.

DESCRIPTION OF THE PREFERRED EMBODIMENT

The harvester is of generally conventional type mounted on front wheels 10 and rear wheels 11, having a topping cutter (not shown) carried by a vertically adjustable frame 12, a pair of gathering arms 13 extending forwardly to pass to both sides of a row of cane as the harvester advances, and rotary crop lifters 14 on the gathering arms to pick up fallen cane. The cane stalks are cut at or near ground level by a pair of laterally aligned counter-rotated base cutters 15.

Above the rear parts of the base cutters 15 is a floating transverse roller 16 which is vertically movable to a limited extent, and which has radiating vanes which are serrated at their outer edges, this roller being driven in the direction indicated by an arrow in FIG. 1 so as to impel cane stalks, cut by the base cutters, rearwardly in relation to the harvester, butt ends first.

The cut cane stalks are conveyed from the base cutters 15 and the floating roller 16 to a chopping cutter assembly at 17, which may be of any suitable well-known type capable of chopping the cane fed to it into substantially equal lengths or billets.

The cane is conveyed by a feed conveyor and cleaning system comprising upper feed rollers 18, lower feed rollers 19 and cleaning rollers 20. All of these rollers 18, 19 and 20 are similar, and each, as shown particularly in FIG. 2, includes a pair of end discs 21 secured on the ends of a cylindrical drum 22 of lesser diameter, a series of equiangularly spaced vanes 23 with serrated outer edges being secured to and radiating from the drum and being secured also to the end discs 21, an axial shaft 24 being secured through the roller.

The shafts of the upper and lower feed rollers 18 and 19 are rotatably mounted in bearings (not shown) on the main frame of the harvester. The upper feed rollers 18 are driven, for example by a chain drive (not shown) so that they are all rotated in the same direction and at the same speed. The lower feed rollers 19 are similarly driven at the same speed as, but in opposite direction to, the upper feed rollers 18, so that the upper and lower feed rollers will feed cane rearwardly between them.

The cleaning rollers 20 are located between each pair of succeeding lower feed rollers, except the foremost and the next one of these. The axes of the parallel shafts of the lower feed rollers 19 lie in a plane inclining upwardly from front to rear. The axes of the parallel shafts of the cleaning rollers 20 lie in a plane parallel to and below the plane containing the axes of the lower feed roller shafts. The lower feed rollers 19 and the interposed cleaning rollers 20 are so arranged that their end discs 21 are close and the vanes 22 of the lower feed rollers 19 are in intermeshing relationship with those of the cleaning rollers 20. The cleaning rollers 20 are driven at the same speed as, but in opposite direction to, the lower feed rollers 19.

At the lower part of the gap between the foremost and the next of the lower feed rollers 19 there may be provided a small butt lifting roller 25, its axis in the plane containing the axes of the cleaning rollers 20, but which is driven in the same direction as the lower feed rollers 19, for example by a chain drive from the shaft of the foremost of the lower feed rollers.

The means for mounting the various roller shafts on the harvester frame, and the means for driving said rollers form per se no part of the present invention. The drive means for the rollers have accordingly been schematically and commonly shown at DM in FIG. 1, with dashed lines representing the drive connection to the axes of the several rollers.

The conveying and cleaning apparatus will be found to be particularly effective in cleaning cane, including mature cane in which the amount of hanging trash or leafy material is substantial, and may have fallen to the bases of the cane stools.

The cane stalks are cut by the base cutters 15, and are fed, butt ends first, under the upper feed rollers 18 and over the lower feed rollers 19. If the butt end of any cane stalk should pass down between the foremost and the next of the lower feed rollers 19, it will be lifted into correct position in the conveyor system by the butt lifting roller 25. As the cane is conveyed between the upper and lower rollers 18 and 19, much material or trash on this cane will be caught by the rotating cleaning rollers 20, driven in opposite direction to the lower feed rollers 19, and will be pulled down from the cane stalks and discharged to the ground. The counter-rotation of the lower feed rollers 19 and the cleaning rollers 20 causes a strong down-draft of air, which materially assists in cleaning the cane. The cleaning rollers 20 are so arranged that they do not interfere with the feeding of the cane stalks to the chopping assembly 17, despite their reverse rotation.

The apparatus is very efficient, too, in removing stones and suckers from the butt end parts of the stalks. The intermeshing arrangement of the vanes of the lower feed rollers 19 and the cleaning rollers 20 keeps the rollers clean of trash, preventing binding of leafy matter about the rollers.

The cleaning apparatus, by removing a substantial proportion of the trash before the cane is chopped into billets in the chopping assembly 17, and elevated by the harvester elevator (not shown) will greatly reduce the load on other cleaning components of the harvester, associated usually with the elevating and discharging system.

I claim:

1. A sugar cane harvester of the type having a frame and a cane stalk feed conveyor, comprising:
   (a) a series of upper feed rollers mounted on said frame, and means for driving said feed rollers in a first direction,
   (b) a series of lower feed rollers mounted on said frame, and means for driving said lower feed rollers in a second direction opposite to the direction of said upper feed rollers, each of said lower feed rollers being formed with a series of longitudinal, radially extending and arcuately spaced vanes the outer edges of which are serrated, said upper and lower feed rollers being adapted to convey cane stalks between them;
   (c) a plurality of cleaning rollers mounted on said frame, each of said cleaning rollers being positioned between successive lower feed rollers, with the plane containing the uppermost parts of the cleaning rollers being below the plane containing the uppermost parts of the lower feed rollers, each of said cleaning rollers being formed with a series of longitudinal, radially extending and arcuately spaced vanes the outer edges of which are serrated, the vanes of said cleaning rollers and adjacent lower feed rollers being in intermeshing relationship, and means for driving said cleaning rollers in a direction opposite to the direction of rotation of said lower feed rollers, whereby leafy matter is torn away from the conveyed cane stalks.

2. The sugar cane harvester of claim 1 wherein said upper and lower feed rollers are rotated at the same speed.

3. The sugar cane harvester of claim 1 further including a small butt lifting roller positioned between the foremost and next successive lower feed rollers, said lifting roller being mounted on said frame with its axis in the same plane as the axes of said cleaning rollers, and means for driving said lifting roller in the same direction as said lower feed rollers.

4. The sugar cane harvester of claim 1 wherein the axes of said lower and upper feed rollers are inclined and parallel with respect to each other.

5. The sugar cane harvester of claim 1 wherein each of said upper feed rollers is formed with a series of longitudinal, radially extending and arcuately spaced vanes the outer edges of which are serrated.

6. The sugar cane harvester of claim 1 wherein the axes of said upper and lower feed rollers are inclined upwardly and parallel to each other, and said upper and lower feed rollers are driven at the same speed, and further including a small butt lifting roller positioned between the foremost and next successive lower feed rollers, the axes of said lifting roller being in the same plane as the axes of said cleaning rollers, and means for driving said lifting roller in the same direction as said lower feed rollers.

* * * * *